US012744491B1

(12) United States Patent
Farrell et al.

(10) Patent No.: US 12,744,491 B1
(45) Date of Patent: Sep. 22, 2026

(54) SOLAR PANEL ASSEMBLIES FOR MARINE VESSELS

(71) Applicant: Brunswick Corporation, Mettawa, IL (US)

(72) Inventors: Kevin T. Farrell, Port Orange, FL (US); Paul E. Olvera, Edgewater, FL (US)

(73) Assignee: Brunswick Corporation, Mettawa, IL (US)

( * ) Notice: Subject to any disclaimer, the term of this patent is extended or adjusted under 35 U.S.C. 154(b) by 313 days.

(21) Appl. No.: 18/586,146

(22) Filed: Feb. 23, 2024

(51) Int. Cl.
*H02S 30/20* (2014.01)
*B63B 17/02* (2006.01)
*H02S 20/30* (2014.01)

(52) U.S. Cl.
CPC .............. *H02S 20/30* (2014.12); *B63B 17/02* (2013.01); *H02S 30/20* (2014.12)

(58) Field of Classification Search
CPC ................................. H02S 30/20; H02S 20/30
See application file for complete search history.

(56) References Cited

U.S. PATENT DOCUMENTS 4,553,037 A 11/1985 Veazey
5,507,943 A 4/1996 Labrador
6,209,477 B1 4/2001 Biedenweg
9,090,321 B1 * 7/2015 Casperson ............... B63H 5/08
9,362,838 B1 6/2016 Balogh
11,518,261 B2 12/2022 Gonring
11,764,726 B1 * 9/2023 Wynn ..................... H02S 20/00 136/245
11,884,176 B1 1/2024 Gonring
2008/0190476 A1 * 8/2008 Baruh ..................... H02S 30/20 114/90

(Continued)

FOREIGN PATENT DOCUMENTS

CN 113320654 A 8/2021
CN 117842293 A 4/2024

(Continued)

OTHER PUBLICATIONS

2021 SeaChoice Products. (n.d.). accessed from https://www.seachoice.com/wp-content/themes/twentyten/2021SeachoiceProducts/141/ on Feb. 2, 2024.

(Continued)

*Primary Examiner* — Jess Whittington
(74) *Attorney, Agent, or Firm* — Andrus Intellectual Property Law, LLP

(57) ABSTRACT

A solar panel assembly for a marine vessel. A first frame is configured to be selectively fixed relative to the marine vessel. A second frame is configured to be moveably coupled to the marine vessel to be moveable relative to the first frame into a stowed position and a deployed position. A solar panel has a surface that extends between a first end and a second end, the first end being coupled to the first frame and the second end being coupled to the second frame, wherein positioning the second frame in the stowed position causes most of the surface of the solar panel to be obscured and inoperable to generate electricity, and wherein positioning the second frame in the deployed position causes most of the surface of the solar panel to be exposed and operable to generate the electricity.

19 Claims, 8 Drawing Sheets

(56) References Cited

U.S. PATENT DOCUMENTS

| | | | | |
|---|---|---|---|---|
| 2010/0065104 | A1* | 3/2010 | Baruh | F24S 20/50<br>126/621 |
| 2016/0336467 | A1* | 11/2016 | Janet | B32B 27/308 |
| 2018/0212432 | A1* | 7/2018 | Byrnes | F03B 13/14 |
| 2019/0169853 | A1* | 6/2019 | Bai | H02S 20/26 |
| 2019/0283843 | A1* | 9/2019 | Greer | B63J 99/00 |
| 2019/0386606 | A1* | 12/2019 | Raghunathan | H02S 40/10 |
| 2020/0385093 | A1 | 12/2020 | Gordon, II | |
| 2021/0371064 | A1 | 12/2021 | Boks | |
| 2021/0371073 | A1* | 12/2021 | Pascucilla | B63J 4/006 |
| 2022/0021328 | A1* | 1/2022 | Raghunathan | E06B 9/15 |
| 2022/0200070 | A1 | 6/2022 | Gonring | |
| 2023/0027325 | A1* | 1/2023 | Sizemore, Jr. | B63B 17/02 |
| 2023/0192240 | A1* | 6/2023 | Ritchel | B63B 17/02<br>114/361 |
| 2024/0068434 | A1 | 2/2024 | Podhola | |

FOREIGN PATENT DOCUMENTS

| | | | |
|---|---|---|---|
| KR | 101389605 | B1 | 4/2014 |
| KR | 20200068819 | A | 6/2020 |
| WO | 2007062278 | A2 | 5/2007 |

OTHER PUBLICATIONS

"Volt Safe Marine" accessed from https://www.voltsafemarine.com/ on Feb. 26, 2024.

"SC-CW-01F" accessed from https://www.scanstrut.com/marine/charge/qi-wireless/hidden-sc-cw-01/f on Feb. 26, 2024.

"Sunreef 60 Eco Surreal Solar Power Breakthrough" accessed from https://sunreef-yachts.com/en/yachts/sunreef-60-eco-surreal-solar-power-breakthrough/ on Mar. 7, 2024.

"100 Watt Hood Solar Panel" accessed from https://www.cascadia4x4.com/products/toyota-land-cruiser-100-series-lexus-lx470-vss-system-100-watt-hood-solar-panel on Mar. 22, 2024.

"Wireless charging structure and efficiency analysis based on wind-solar hybrid power supply system" accessed from https://www.sciencedirect.com/science/article/pii/S2352484722002621 on Mar. 26, 2024.

* cited by examiner

SOLAR PANEL ASSEMBLIES FOR MARINE VESSELS

FIELD

The present disclosure generally relates to solar panels for marine vessels, and particularly solar panel assemblies that are movable between stowed and deployed positions.

BACKGROUND

The following provide background information and are incorporated herein by reference in entirety.

U.S. Pat. No. 6,209,477 discloses a boat having a retractable top, at least one strut having a first end attached to the top, and motor driven retraction device attached to the boat. The electrically driven device is attached to the boat and operatively coupled to the strut by means of a rack and pinion arrangement. The strut is moved between its first and second positions by the electrically driven device, whereby the top is electrically raised and lowered.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One aspect according to the present disclosure generally relates to a solar panel assembly for a marine vessel. The solar panel assembly includes a first frame configured to be selectively fixed relative to the marine vessel and a second frame configured to be moveably coupled to the marine vessel to be moveable relative to the first frame into a stowed position and a deployed position. The solar panel assembly further includes a solar panel having a surface that extends between a first end and a second end, the first end being coupled to the first frame and the second end being coupled to the second frame. Positioning the second frame in the stowed position causes most of the surface of the solar panel to be obscured and inoperable to generate electricity. Positioning the second frame in the deployed position causes most of the surface of the solar panel to be exposed and operable to generate the electricity.

In certain examples, the solar panel is a flexible sheet that is configured to provide shade for the marine vessel when the second frame is in the deployed position.

In certain examples, the solar panel is a flexible sheet and the solar panel assembly further includes a drum upon which the flexible sheet rolls up when the second frame is in the stowed position. In certain examples, the drum is rotatably coupled to the first frame, and the drum is wound so as to automatically roll up the flexible sheet when the second frame is moved towards the stowed position. In certain examples, the drum is configured such that the flexible sheet is unrolled by moving the second frame towards the deployed position.

In certain examples, the second frame is moveably pivotally. In certain examples, the second frame is pivotally coupled to the first frame.

In certain examples, the solar panel is electrically coupled to the marine vessel via conductors that extend through the first frame and/or the second frame.

In certain examples, the marine vessel is configured to be situated in a body of water, and the first frame and the second frame are configured such that when the first frame is in the deployed position the surface of the solar panel is substantially parallel to a surface of the body of water.

In certain examples, the marine vessel has a helm positioned therein, and the first frame and the second frame are configured such that when the first frame is in the stowed position the solar panel is positioned entirely aft of the helm and when the first frame is in the deployed position the second end of the solar panel extends forward of the helm to thereby provide shade for the helm.

In certain examples, the solar panel has a width that is unchanged by moving the second frame, wherein at least one of the first frame and the second frame comprises opposing side poles laterally separated by a span with an upper cross-member extending therebetween, and wherein the solar panel is coupled to the at least one of the first frame and the second frame below the upper cross-member such that the width of the solar panel is approximately equal to the span between the side poles.

In certain examples, the surface of the solar panel is substantially planar when the second frame is in the deployed position and substantially non-planar when the second frame is in the stowed position.

Another aspect according to the present disclosure generally relates to a solar panel assembly configured for selectively provided shade for a marine vessel. The solar panel assembly includes a first frame configured to be selectively fixed relative to the marine vessel and a second frame configured to be moveably coupled to the marine vessel to be moveable relative to the first frame into a stowed position and a deployed position. A flexible solar panel has a surface that extends between a first end and a second end and is configured to generate electricity. A drum is rotatably coupled to the first frame, where the first end of the flexible solar panel is coupled to the drum, and where the second end of the flexible solar panel is coupled to the first frame such that the flexible solar panel unrolls from the drum when moving the second frame towards the deployed position and rolls onto the drum when moving the second frame towards the stowed position. Unrolling the flexible solar panel provides shade for the marine vessel.

In certain examples, the drum is wound so as to automatically roll the flexible solar panel thereon when the second frame is moved towards the stowed position.

In certain examples, the first frame and the second frame are selectively movable relative to the marine vessel into a folded configuration in which the first frame and the second frame are folded onto the marine vessel.

In certain examples, the solar panel assembly further includes a motor operable to move the second frame relative to the marine vessel. In certain examples, the motor is operable to rotate the drum.

In certain examples, the first frame and the second frame are configured such that the first end and the second end of the flexible solar panel are approximately a same height above the marine vessel as each other when the second frame is in the deployed position. In certain examples, the first frame and the second frame are further configured such that the first end and the second end of the flexible solar panel are approximately the same height above the marine vessel as each other when the second frame is in the stowed position.

Another aspect according to the present disclosure generally relates to a solar panel assembly for a marine vessel. A first frame is configured to be selectively fixed relative to the marine vessel. A second frame is configured to be pivotally coupled to the first frame to be moveable into a stowed position and a deployed position, where the second frame is farther from the first frame in the deployed position than in the stowed position. A drum is rotatably coupled to the first frame. A flexible solar panel has a surface that extends between a first end and a second end, where the flexible solar panel is configured to generate electricity. The first end of the flexible solar panel is coupled to the drum so as to rotate therewith, the second end of the flexible solar panel is coupled to the first frame, and the drum is rotationally biased relative to the first frame such that pivoting the second frame towards the first frame causes the flexible solar panel to be automatically rolled onto the drum and pivoting the second frame away from the first frame opposes the rotational bias and causes the flexible solar panel to automatically unroll from the drum. A conductor extends through the first frame and/or the second frame for electrically coupling the flexible solar panel to the marine vessel. When the second frame is in the stowed position, most of the surface of the solar panel is inoperable to generate electricity, and when the second frame is in the deployed position, most of the surface of the solar panel to be exposed and operable to generate the electricity.

It should be recognized that the different aspects described throughout this disclosure may be combined in different manners, including those than expressly disclosed in the provided examples, while still constituting an invention accord to the present disclosure.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

As used herein, unless otherwise limited or defined, discussion of particular directions is provided by example only, with regard to particular embodiments or relevant illustrations. For example, discussion of "top," "bottom," "front," "rear," "left," "right," "horizontal," "vertical," "lateral," and "longitudinal" features and/or relative motion, e.g., movement "up" and "down," is generally intended as a description only of the orientation of such features relative to a reference frame of a particular example or illustration. Correspondingly, for example, a "top" feature may sometimes be disposed below a "bottom" feature (and so on), in some arrangements or embodiments. Additionally or alternatively, embodiments may be arranged in a different orientation such that "top" and "bottom" features are arranged horizontally relative to each other, for example in a "left-to-right" orientation.

Through research and development, the present inventors identified disadvantages and limitations of marine solar panel assemblies presently known in the art, including that known solar panels are configured to be permanently installed on a marine vessel. Because known solar panel assemblies are not designed to be removed, these solar panels cannot, or cannot easily, be removed for storage and/or for protection from adverse environmental conditions. This leads to unnecessary damage and wear that reduces the lifespan and/or effectiveness of the solar panels, resulting in an increased cost and time for maintenance and replacement, increased cost of manufacturing and purchase due to requiring more durable materials, and increase waste for landfills. The present inventors have thus realized a need in the art to provide a solar panel assembly for marine vessels that is easily moveable between deployed position (also referred to as operating positions) and stowed positions in which the solar panels are protected. The present disclosure is a result of these efforts.

Figure 1:
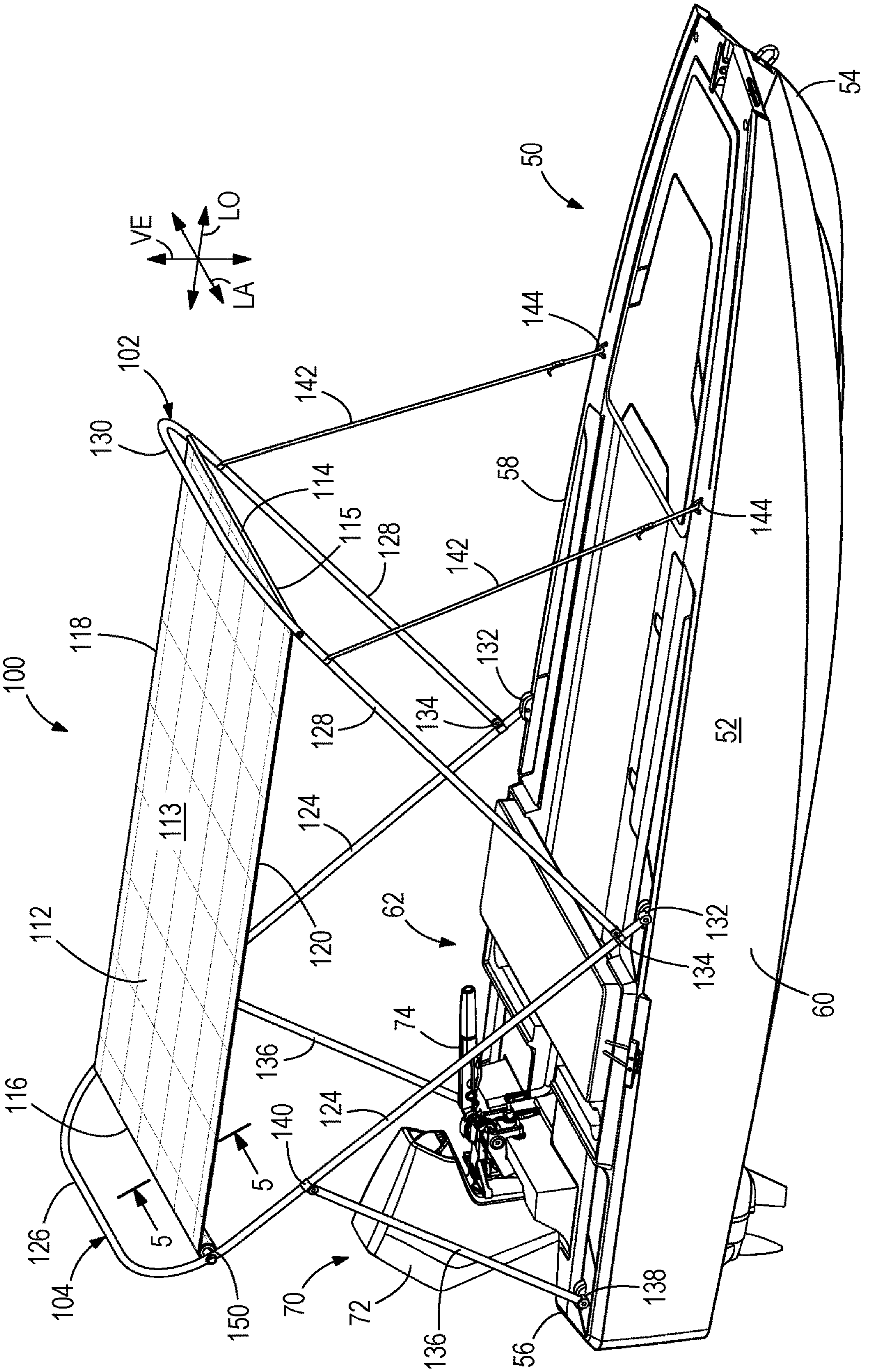
FIG. 1 is a perspective view of a marine vessel with an embodiment of a solar panel assembly according to the present disclosure in a deployed position.

FIG. 1 illustrates a marine vessel 50 including a bimini top configured as an embodiment of a solar panel assembly 100 according to the present disclosure. The hull 52 of the marine vessel 50 extends from top to bottom in an vertical direction VE, from bow 54 to stern 56 in a longitudinal direction LO which is perpendicular to the vertical direction VE, and from a port side 58 to an opposite starboard side 60 in a lateral direction LA which is perpendicular to the vertical direction VE and perpendicular to the longitudinal direction LO. A propulsion system 70 mounted at the stern 16 of the marine vessel 10. The propulsion system 70 includes a marine drive 72 configured to generate a thrust force to propel the marine vessel 50 through the body of water in which the marine vessel 50 is situated. A user may operate the propulsion system 70 at a helm position 62 on the marine vessel 50, for example using a tiller arm 74 operably coupled to the marine drive 72. In the illustrated embodiments, the marine drive 72 is shown as an outboard motor mounted on the transom of the marine vessel 50. Some embodiments, however, may include a different number of marine drives 72 and/or at least one marine drive may be a configured as a different type of marine drive, such as a stern drive and/or another type of marine drive or marine propulsion device.

The present disclosure also contemplates applications for marine vessels that do not include marine drives for generating propulsion, for example pedal boats, row boats, canoes, kayaks, sailboats, and/or other marine vessels that may accommodate a bimini or other shade device.

Figure 2:
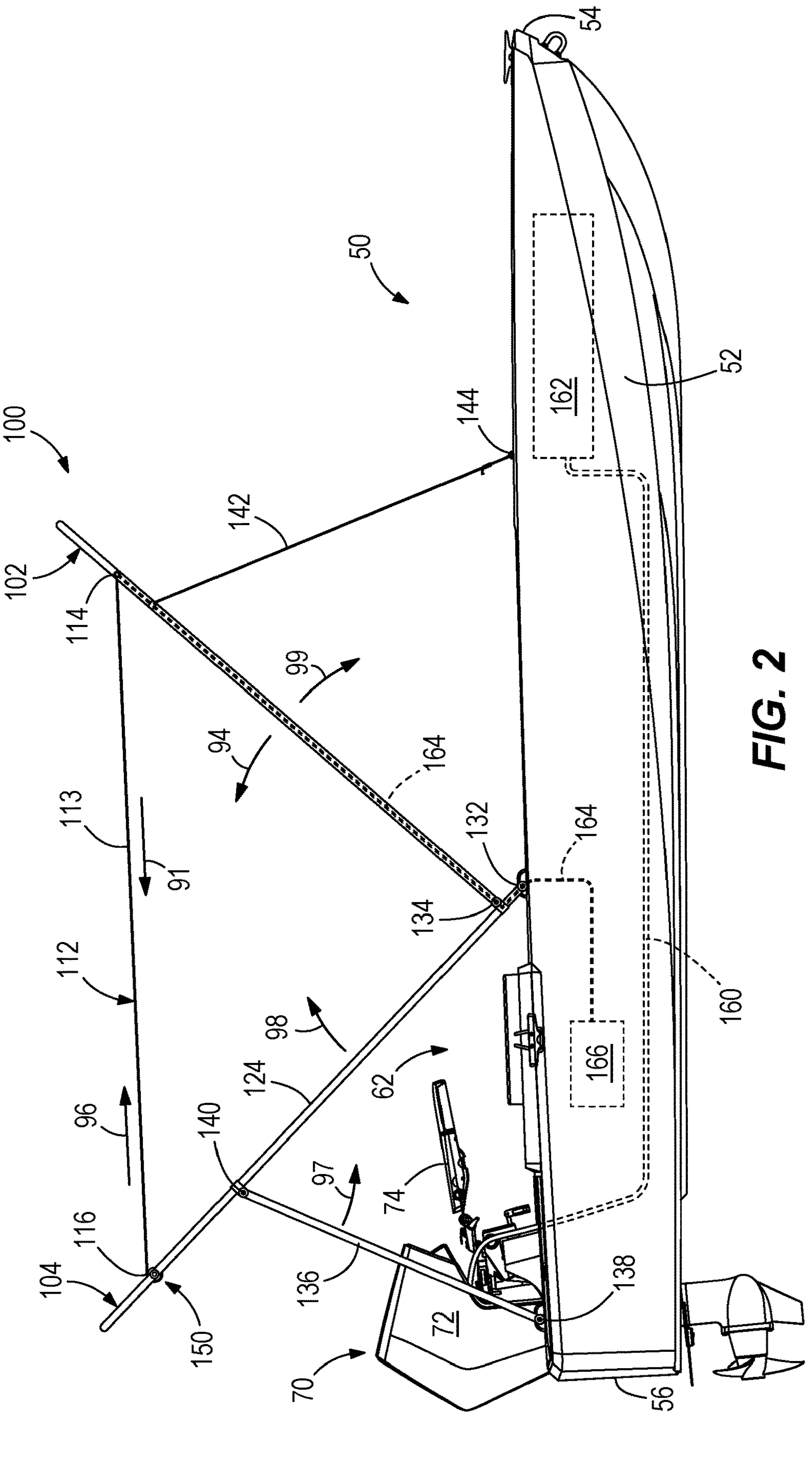
FIG. 2 is a side view of the marine vessel and the solar panel assembly of FIG. 1.
Figure 3:
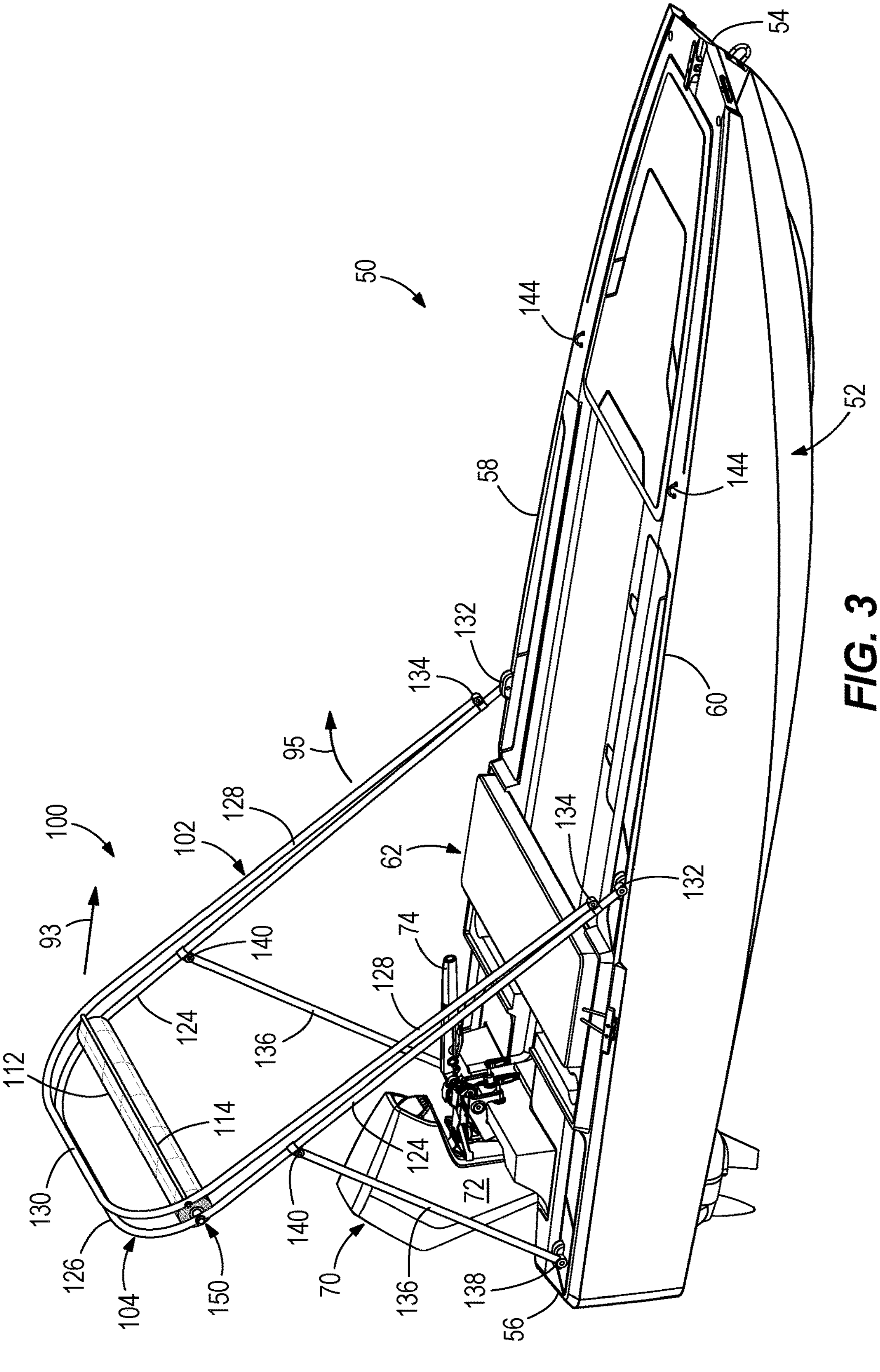
FIG. 3 is a perspective view of the marine vessel and the solar panel assembly of FIG. 1 with the solar panel assembly in a stowed position.

Referring to FIGS. 1-3, the solar panel assembly 100 includes a rear frame 104, a forward frame 102, and a solar panel 112 having a surface that is supported by and extends between a rear end 116 coupled to the rear frame 104 and a front end 114 coupled to the forward frame 102. The rear frame 104 is generally U-shaped and includes two upright poles 124 connected to port and starboard sides 58, 60 of the marine vessel 50, as well as an upper cross-member 126 that extends laterally between upper ends of the rear upright poles 124, thereby defining a span between the rear upright poles 124. The lower ends of the rear upright poles 124 are pivotably connected to the marine vessel 50 by pivot brackets 132 positioned proximate the port side 58 and the starboard side 60 of the marine vessel 50. Each rear upright pole 124 is supported by a brace member 136 extending rearwardly from the rear upright poles 124. Each brace member 136 extends between an upper end pivotably coupled to a rear upright pole 124 by a pivot coupling 140 and a lower end that is coupled to a mounting bracket 138 on the port side 58 or the starboard side 60 of the marine vessel 50. The brace members 136 are configured to secure the rear upright poles 124 in a fixed position relative to the marine vessel 50. However, as discussed in more detail below, the lower ends of the brace members 136 may be decoupled from the mounting brackets 138, thereby allowing the rear frame 104 to pivot relative to the marine vessel 50.

Similar to the rear frame 104, the forward frame 102 is generally U-shaped and includes two upright poles 128 connected to the port and starboard sides 58, 60 of the marine vessel 50 and an upper cross-member 130 that extends laterally across the span between upper ends of the forward upright poles 128. Unlike the rear frame 104, however, the forward frame 102 is movably coupled to the marine vessel 50 via the rear upright poles 124. With continued reference to FIGS. 1-3, the lower ends of the forward upright poles 128 are pivotably coupled to the rear upright poles 124 by pivot couplings 134 proximate the lower ends of the rear upright poles 124. The forward frame 102 can pivot about a pivot axis (not shown) defined by the pivot couplings 134 in a forward direction and a rearward direction to move the forward frame 102 into and between a deployed position (FIGS. 1 and 2) and a stowed position (FIG. 3). To retain the forward upright poles 128 in the deployed position, brace straps 142 are configured to extend from the upper ends of the forward upright poles 128 to a corresponding tie off point 144 on the port or starboard side 58, 60 of the marine vessel 50.

As previously mentioned, the forward frame 102 and the rear frame 104 support a solar panel 112 on the marine vessel 50. Referring to FIGS. 1 and 2, the illustrated solar panel 112 is configured as a flexible sheet that provides shade for the marine vessel 50 when the solar panel assembly 100 is in the deployed position. In the deployed position, the solar panel 112 forms a substantially planar sheet that is generally parallel to a surface of the body of water in which the marine vessel 50 is situated. In particular, the illustrated solar panel 112 extends from a front end 114, which is supported on a horizontal bar 115 that extends laterally between the forward upright poles 128 below the forward upper cross-member 130, to a rear end 116 that is supported on a retractor drum assembly 150 (and/or another retractor device) extending between the upright poles 124 of the rear frame 104. The retractor drum assembly may function like a traditional window shade or pull-down projector screen. One example of a commercially available product that may be used as the retractor drum assembly is the EZ Rise Cordless Shade 1½" Spring with Slow Rise Damper produced by the Rowley Company of Gastonia, North Carolina.

The solar panel 112 extends laterally between opposing port and starboard lateral edges 118, 120 such that the lateral width of the solar panel 112 is approximately equal to the span between the upright poles 124, 128. The front and rear frames 102, 104 are dimensioned such that the first and second ends 114, 116 of the solar panel 112 are approximately a same height above the marine vessel 50 as each other when the rear frame 104 is in the deployed position. The present inventors have recognized that this configuration, and particularly the front frame 102 and rear frame 104 being u-shaped, maximize the area for providing solar cells relative to the longitudinal width of the marine vessel 50. For example, positioning the solar panel 112 vertically lower than the tops of the front and rear frame 102, 104 provides that there is additional span for the solar cells to extend longitudinally. However, it should be recognized that other configurations are also contemplated by the present disclosure, including the solar panel 112 extending between the tops of the front and rear frames 102, 104.

With continued reference to FIGS. 1 and 2, the solar panel 112 extends longitudinally along the length of the marine vessel 50 in order to provide shade for the helm position 62 and other locations within the marine vessel 50, and so that most (e.g., greater than 50%, and in certain examples beyond "most" to be greater than 60%, 66%, 75%, 80%, 90%, or 95%) of a top surface 113 of the solar panel 112 is exposed and operable to generate electricity. To store generated energy, the marine vessel 50 may include at least one battery 162, 166 configured to provide energy to operate the propulsion system 70 and/or other systems of the marine vessel 50. As illustrated in FIG. 2, the solar panel 112 is connected to a battery 166 by at least one conductor 164, such as a wire of appropriate gauge, that extends through and/or along the forward frame 102 and a portion of the rear frame 104 proximate the pivot bracket 132. In certain embodiments, one of the pivot couplings 134 is configured such that the conductor 164 may extend therethrough. In another embodiment, the conductor 164 exits one of the upright poles 128 of the front frame 102 via an opening therein and enters the upright pole 124 of the rear frame 104 via an opening therein so as to not extend through the pivot coupling 134. In yet another embodiment, the conductor extends through the upright pole 128, but not the upright pole 124 (e.g., entering the hull or otherwise extending to the batteries 162, 166. These different embodiments may vary in the complexity of routing the conductor 164, as well as whether conventional pivot couplings and poles or members may be used. While not shown, grommets, coatings, and/or other conventional mechanisms may be incorporated to protect the conductor 164 from being damaged by the edges of the openings in the upright pole 124 of the upright pole 128.

In the illustrated embodiments, the marine vessel 50 is equipped with a first battery 162 connected to the marine drive 72 by a conductor 160 and a second battery 166 connected to the solar panel 112. Some embodiments, however, may be differently configured. For example, the solar panel 112 may be electrically connected to both of the illustrated batteries 162, 166. Some embodiments of a marine vessel 50 may be configured with a single battery or battery bank that is connected to the solar panel 112 and the propulsion system 70. Additionally or alternatively, some embodiments of a solar panel assembly 100 may include a solar panel 112 that is electrically couple to a battery or battery bank by a different arrangement of electrical conductors. For example, a conductor may be configured to extend through or along only one of the front frame 102 or the rear frame 104. Some embodiments may include a conductor that extends though a different part of the solar panel assembly 100, for example one of the brace members 136. It should be recognized that the present disclosure also contemplates configurations in which battery charging control systems and/or battery management systems are electrically coupled between the solar panel and the one or more batteries. Since battery charging control systems and/or battery management systems are generally known in the art, further detail regarding these systems are not provided herein.

Figure 5:
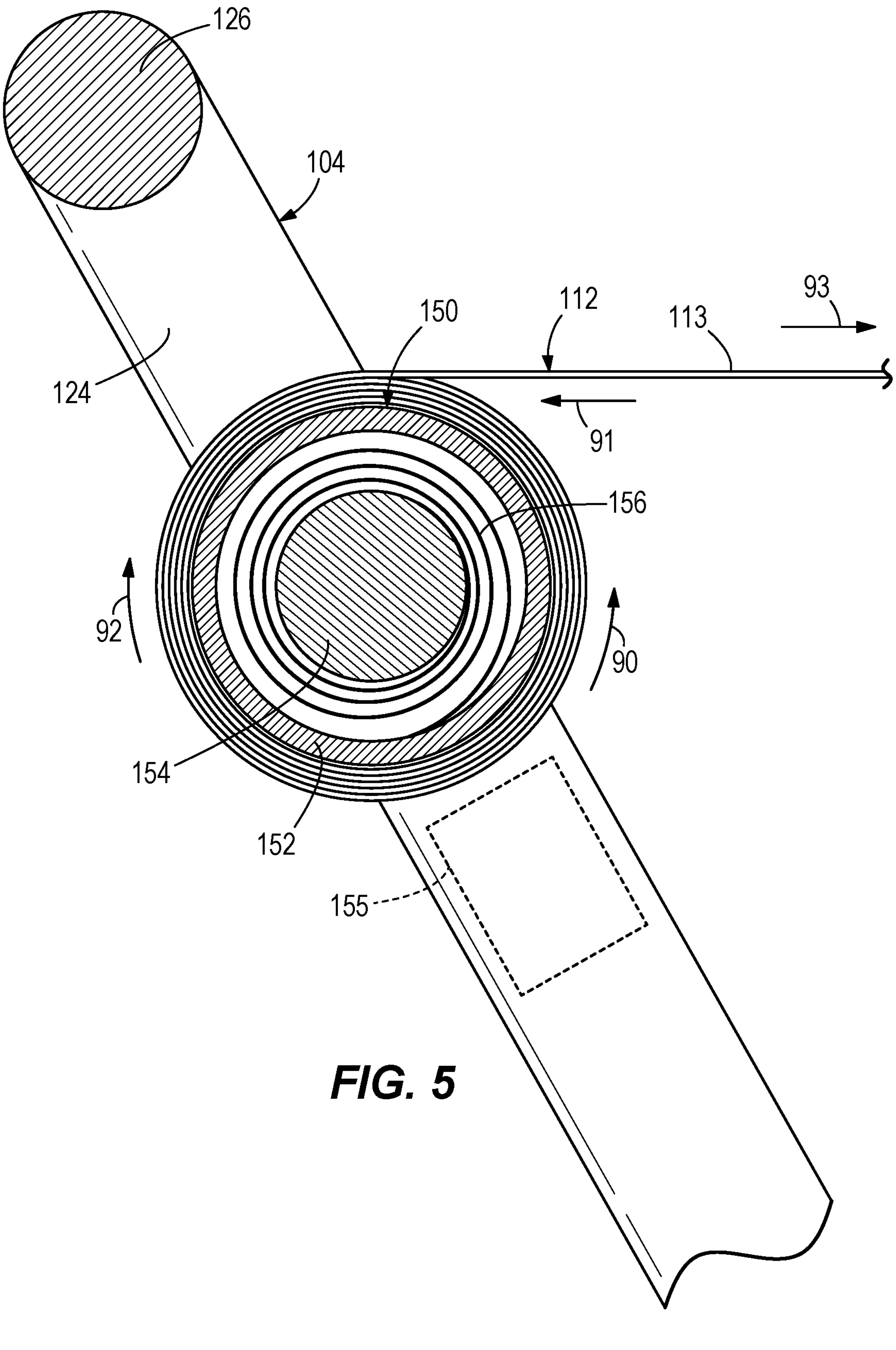
FIG. 5 is a sectional view taken along the line 5-5 in FIG. 1.

To protect the solar panel 112 from environmental conditions, the forward frame 102 can be moved into the stowed position (FIG. 3) by pivoting the forward frame 102 rearwardly toward the stern 56 of the marine vessel 50 about the pivot couplings 134. As the forward frame 102 pivots into the stowed position, a retractor device is configured to automatically transition the solar panel 112 into a stored stated in which a majority of the electricity-generating surface 113 is covered. In the illustrated embodiments, for example, the retractor device is a retractor drum assembly 150 that is configured to automatically roll up the flexible solar panel sheet 112 therein. Referring to FIG. 5, which schematically illustrates an embodiment of a retractor drum assembly 150, a retractor drum assembly 150 may include a drum 152 that is coupled to the rear end 116 of the solar panel 112 and rotatably supported on a roller shaft 154. The drum 152 and the roller shaft 154 are supported on the rear frame 104 below the upper cross-member 126 and extend laterally across the span between the rear upright poles 124. To roll and unroll the flexible solar panel 112 from the drum 152, the drum 152 is configured to rotate about the roller shaft 154 in a first direction (indicated by arrow 90 in FIG. 5) or a second direction (indicated by arrow 92 in FIG. 5), respectively. A rotary biasing device 156, which may be configured as a rotary spring 156 in the illustrated embodiments, operatively couples the drum 152 to the roller shaft 154 and is configured to bias the drum 152 to rotate in the first direction 90, thereby retracting the solar panel 112 rearward (e.g., in the direction of arrow 91 in FIG. 5) and rolling the solar panel 112 onto the radially outer surface of the drum 152. Applying tension to the solar panel 112 to pull the forward end 114 thereof in the forward direction (e.g., in the direction of arrow 93 in FIG. 5) causes the drum 152 to rotate in the second direction 92 against the biasing force of the rotary biasing device 156, thereby unrolling the solar panel 112 from the drum 152.

Thus, the novel solar panel assembly 100 of FIGS. 1-4 provides a solar panel 112 bimini top that is configured to generate electricity and provide shade when in the deployed position and to store and protect the solar panel 112 in the stowed position. Referring to FIGS. 2 and 3, some embodiments of the solar panel assembly 100 can be manually moved into and between the deployed position (FIG. 2) and the stowed position (FIG. 3) by a user. To stow the flexible solar panel 112, the brace straps 142 are decoupled from the tie off points 144 so that the front frame 102 may pivot rearward on the pivot couplings 134, for example in the direction of arrow 94 in FIG. 2. As the front frame 102 pivots rearward towards the stowed position, the front end 114 of the solar panel 112 moves towards the rear frame 104 and the rotary biasing device 156 rotates the drum 152 to automatically wind the solar panel onto the drum 152, for example in the direction of arrow 91 in FIG. 2. When the front frame 102 is in the stowed position, the solar panel 112 is in a generally non-planar form and may be positioned entirely aft of the helm 62. A majority of the solar panel 112 is obscured and inoperable to generate electricity when in the stowed position. This may be useful, for example, in order to protect the solar panel 112, for example from environmental damage, when the solar panel assembly 100 is not in use. The configuration also allows the user to stow the solar panel 112 when the batteries are fully charged and/or it is preferred to not have a cover above the marine vessel 50, whether to enjoy the sunshine or provide additional clearance for fishing, for example.

In some embodiments, the rotary biasing device 156 may be configured to provide a biasing force that is sufficient to pull the front frame 102 rearward without any external force (e.g., from a user on the marine vessel 50), thereby automatically moving the front frame 102 into the stowed position. Some embodiments of a solar panel assembly 100, however, may be configured such that a user must manually pivot the front frame 102 rearward through at least a portion of the front frame pivot range. Additionally or alternatively, some embodiments of a solar panel assembly 100 may be configured with a motor 155 (FIG. 5) is operable to move the front frame 102 in at least one direction relative to the rear frame 104 into and between the stowed and deployed positions. For example, a motor may be configured to rotate the drum 152 of the retractor drum assembly 150 via engagement between a worm gear rotated by the motor 155 and a gear along the roller shaft 154 in order to roll the solar panel 112 onto the drum 152, thereby pulling the front frame 102 towards the stowed position. In addition or in the alternative, in certain embodiments a motor or another mechanical system moves the front frame 102 and/or rear frame 104 separately from rotating the drum, such as discussed in U.S. Pat. No. 6,209,477, which is incorporated by reference herein in its entirety.

With continued reference to FIG. 1-4, to deploy the flexible solar panel 112 from the stowed position, the front frame 102 is pivoted about the pivot couplings 134 in a forward direction, for example in the direction of arrow 96 in FIG. 3. As the front frame 102 is pivoted in the forward direction (e.g., by a user), the front end 114 of the solar panel 112 moves towards the rear frame 104 and tension in the solar panel 112 forces the drum 152 to rotate against the biasing force, thereby unwinding the solar panel from the retractor drum assembly 150, for example in the direction of arrow 93 in FIG. 3. Continued pivoting of the front frame 102 in the forward direction extends the solar panel 112 forward to provide additional shade and expose more of the electricity-generating surface 113 thereof. Once the desired amount of the solar panel 112 has be unrolled, the brace straps 142 may be connected to the tie down points 144 to secure the front frame 102 in the deployed position.

Figure 4:
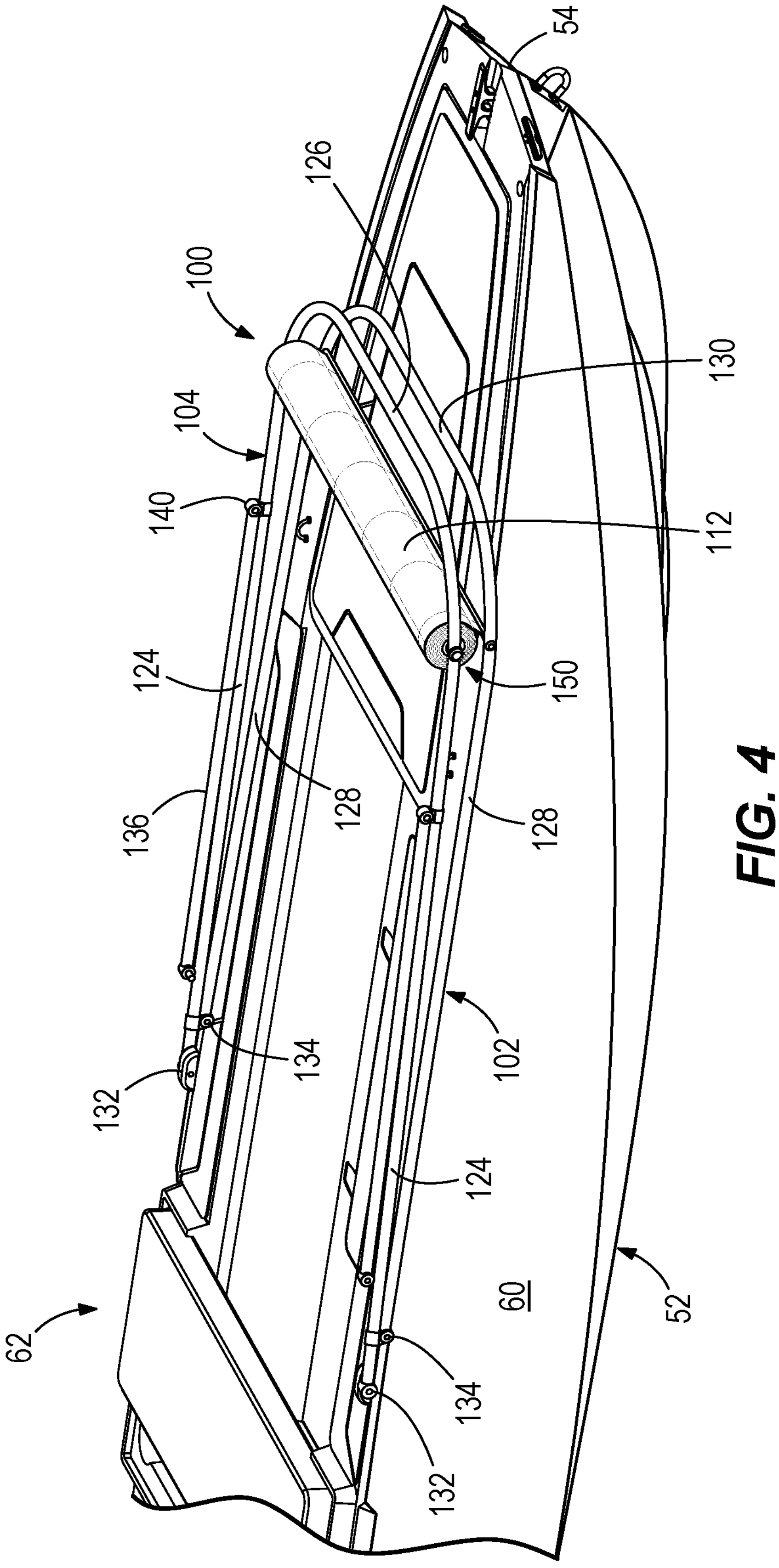
FIG. 4 is a detailed perspective view of the marine vessel and the solar panel assembly of FIG. 1 with the solar panel assembly in a folded position.

Some embodiments of a solar panel assembly 100 may be movable into a folded position in which the forward frame 102 and the rear frame 104 are folded onto the marine vessel 50, for example as illustrated in FIG. 4. Referring to FIGS. 2 and 4, the solar panel assembly 100 can be moved into the folded position by pivoting the front and rear frames 102, 104 in the forward direction. To pivot the rear frame 104 forward, the brace members 136 are first decoupled from the mounting brackets 138 and pivoted about the pivot couplings 140 onto the rear upright members 124, for example in the direction of arrow 97 in FIG. 2. Once the brace members 136 are decoupled from the mounting brackets 138, the rear frame 104 is permitted to pivot about the pivot brackets 132 towards the front frame 102, for example in the direction of arrow 98. As the rear frame 104 pivots forward, the retractor drum assembly 150 moves towards the front end 114 of the solar panel 112, for example in the direction of arrow 96 in FIG. 2. Forward movement of the retractor drum assembly 150 allows the rotary biasing device 156 to rotate the drum 152, thereby rolling the solar panel 112 onto the drum 152.

Decoupling of the brace members 136 from the mounting brackets 138 additionally allows the front frame 102 to pivot forward and downward onto the marine vessel 50, for example in the direction of arrow 99 in FIG. 2. Continued pivoting of the front and rear frames 102, 104 about their respective pivots 134, 132 moves the front and rear frames 102, 104 downward towards the marine vessel 50 and into the folded position illustrated in FIG. 4. Advantageously, the folded position of the solar panel assembly 100 allows the marine vessel 50 to be operated, stored and/or transported without risk of damaging the solar panel assembly 100.

Figure 6:
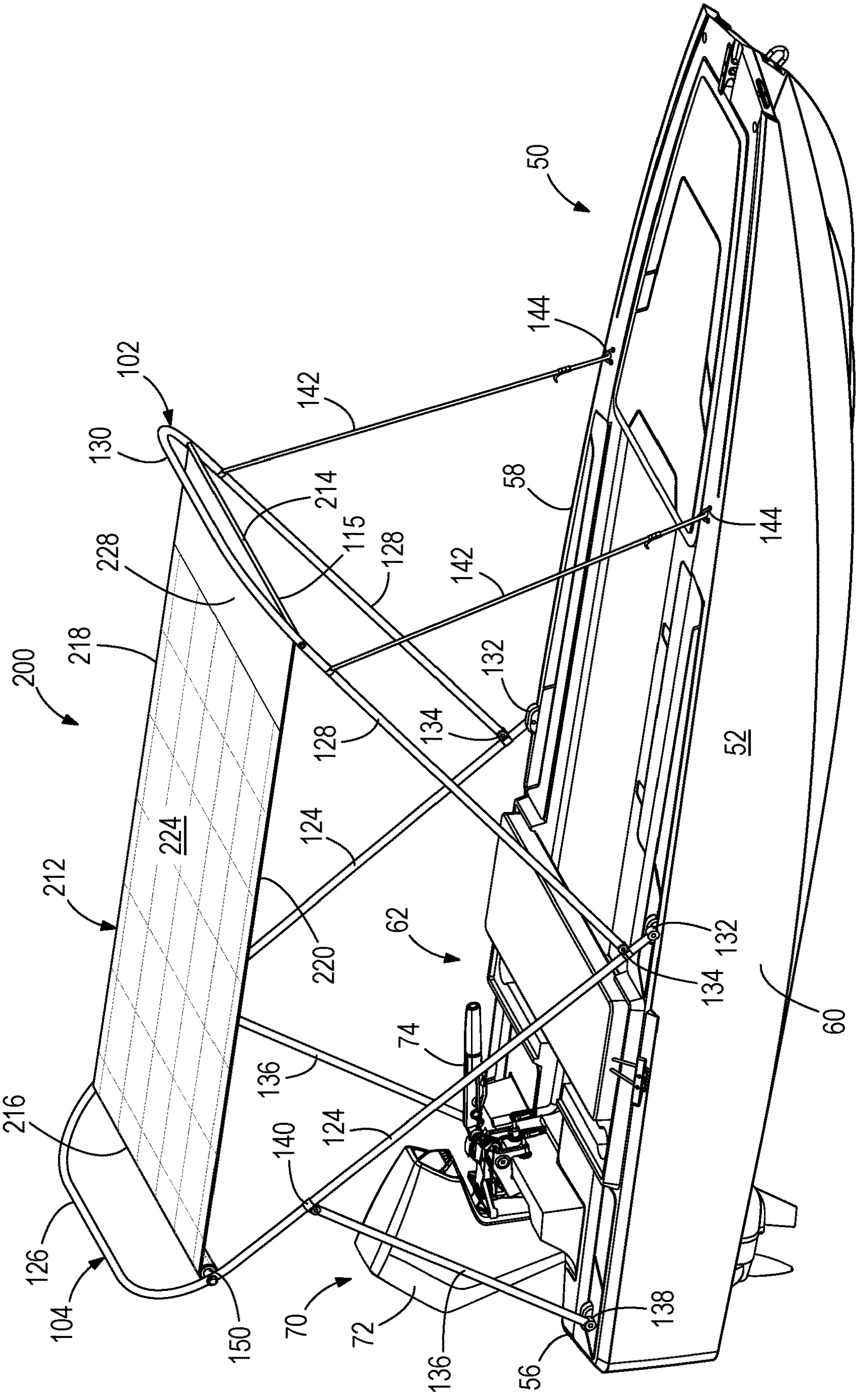
FIG. 6 is a perspective view of a marine vessel with another embodiment of a solar panel assembly.
Figure 7:
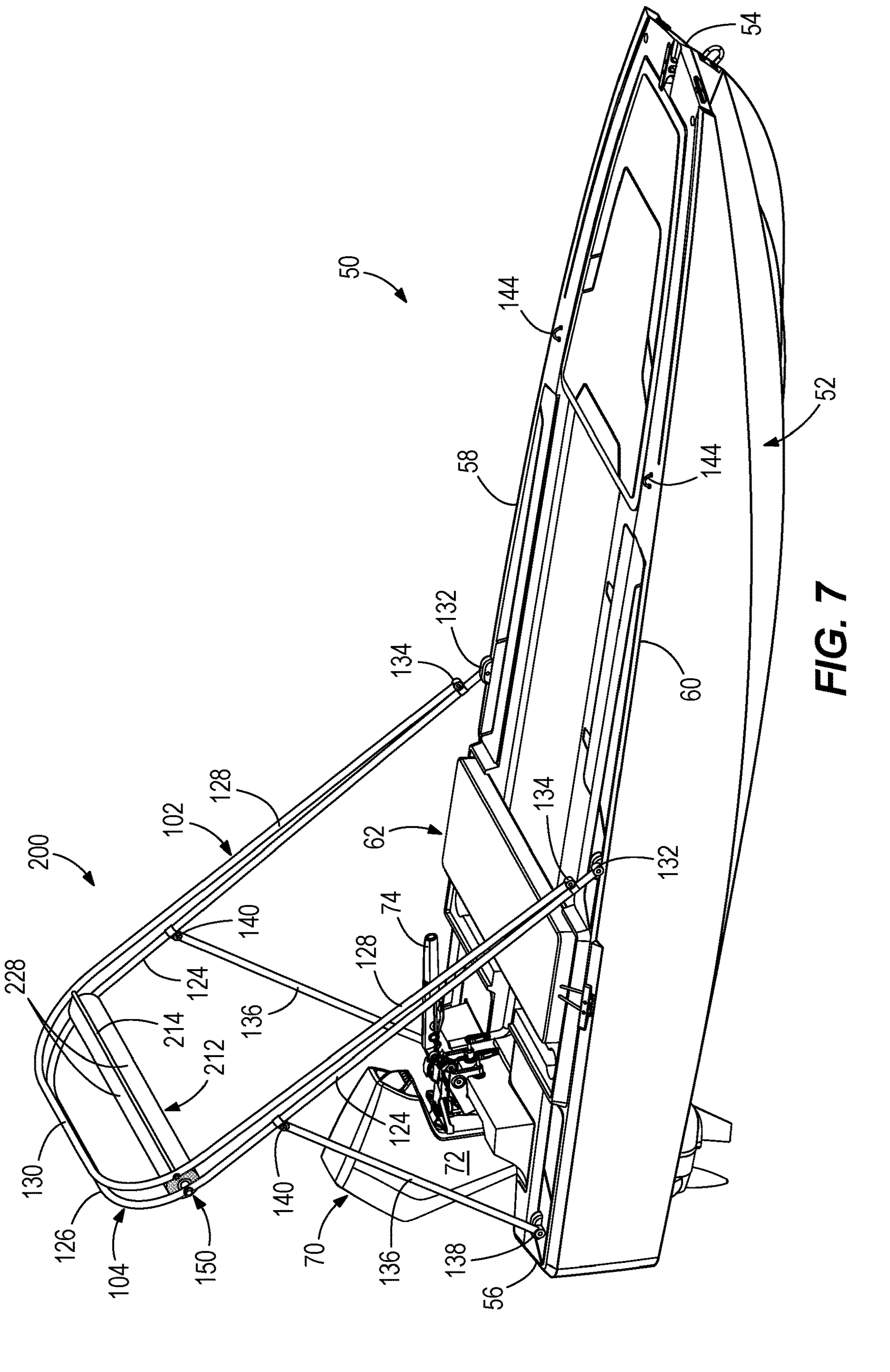
FIG. 7 is a perspective view of the marine vessel and bimini top solar panel assembly of FIG. 6 with the solar panel assembly in a retracted position.

In the embodiments of FIGS. 1-4, the solar panel assembly 100 is configured with a flexible solar panel 112 with solar cells for generating electricity across substantially the entire upper surface 113 thereof. Some embodiments, however, may be differently configured. For example, referring to FIGS. 6 and 7, some embodiments of a solar panel assembly 200 may be configured with a flexible solar panel 212 with an electricity-generating section 224 and a protective section 228 configured to cover the electricity-generating section 224 when the solar panel 212 is stowed (FIG. 7). In the embodiments of FIGS. 6 and 7, the marine vessel 50, front frame 102, the rear frame 104, the retractor drum assembly 150 and other related support components are generally the same as those described with respect to FIGS. 1-5 and will not be described again. Some embodiments of a solar panel assembly 200, however, may be configured with a differently configured front frame, rear frame, retractor device, and/or any other related components.

Referring to FIGS. 6 and 7, the solar panel assembly 200 includes a flexible solar panel 212 that extends longitudinally between a front end 214 connected to the front frame 102 and a rear end 216 connected to the retractor drum assembly 150 on the rear frame 104, and laterally between opposing port and starboard lateral edges 218, 220. Proximate the front end 214, the solar panel 212 includes a protective section 228 that does not include any solar cells for generating electricity. An electricity-generating section 224 of the solar panel 212 extends rearward from the protective section 228 to the rear end 216 of the solar panel 212. When the solar panel 212 is deployed (FIG. 6), substantially all of the exposed surface of the solar panel 212 is configured to generate electricity. However, when the solar panel 212 is retracted, the entire electricity-generating section 224 is covered by the protective section 228, as illustrated in FIG. 7. As the front frame 102 pivots rearward into the stowed position, the retractor drum assembly 150 rolls the solar panel 212 onto the rotating drum 152 (FIG. 5), as discussed in reference to FIGS. 2 and 3. When the protective section 228 reaches the retractor drum assembly 150, it is rolled onto and wraps around the drum 152, thereby covering the electricity-generating section 224. Advantageously, when in the stowed position, the protective section 228 prevents objects from directly contacting the electricity-generating section 224, thereby protecting the electricity-generating section 224 from damage.

In certain embodiments, the protective section 228 extends the entire length between the front end 214 and the rear end 216 and solar cells are supported thereon with the portion defined to be the electricity-generating section 224. In other words, the protective section 228 may comprise a foundational sheet upon which the solar cells are supported. In other examples, the protective section 228 is coupled to the electricity-generating section 224, for example via stitching or other techniques known in the art.

Figure 8:
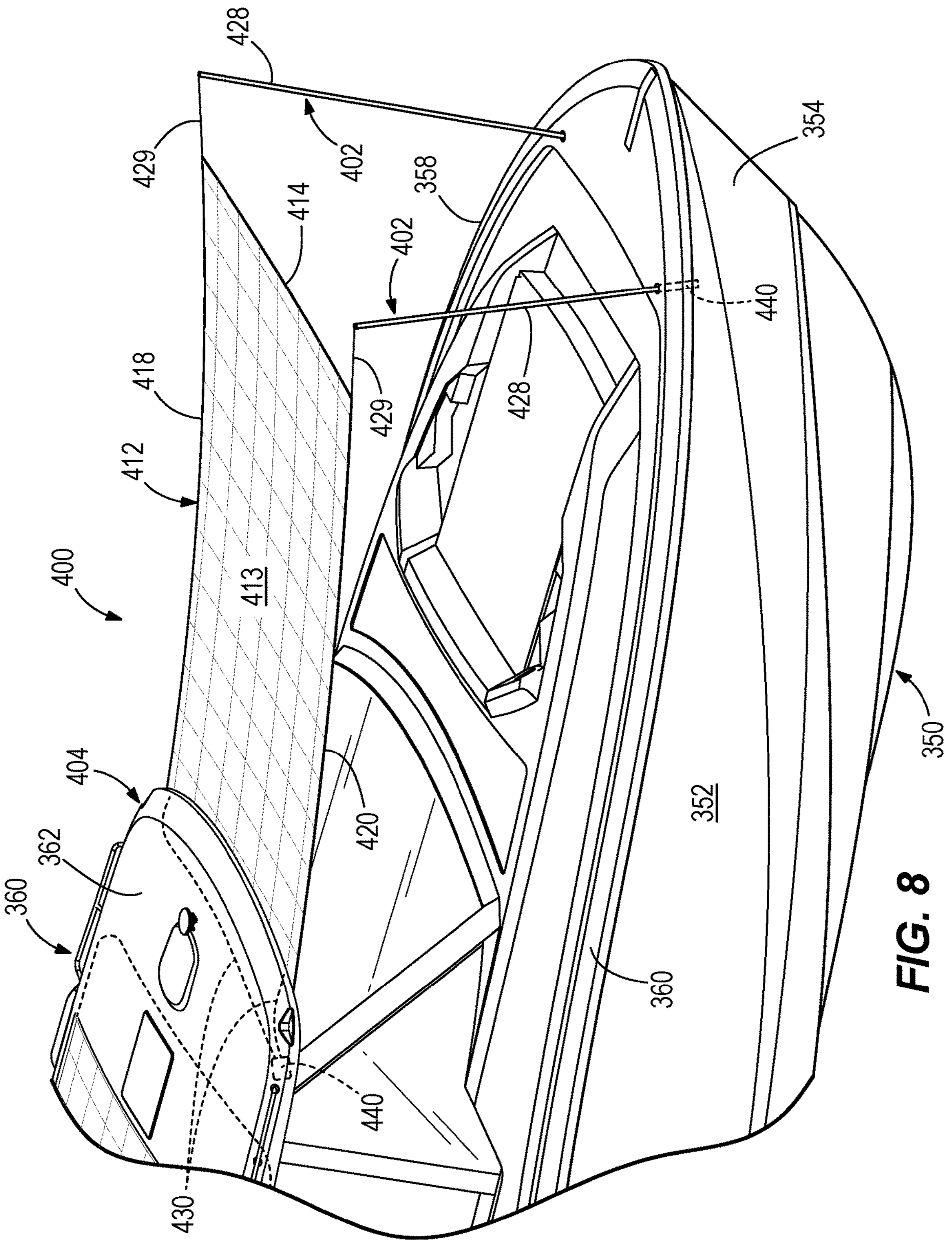
FIG. 8 is a perspective view of a marine vessel with another embodiment of a solar panel assembly according to the present disclosure in a deployed position.

In the embodiments of FIGS. 1-7, the flexible solar panel is supported on front and rear pivoting frame members. Some embodiments, however, may be differently configured. For example, FIG. 8 illustrates an embodiment of a solar panel assembly 400 configured for a marine vessel 350 including a cabin 360 with a hardtop 362. Like the embodiments of FIGS. 1-7, the solar panel assembly 400 of FIG. 8 includes a flexible solar panel 412 that is supported by a forward frame 402 and a rear frame 404. Unlike the embodiments of FIGS. 1-7, however, the embodiment of FIG. 8 is configured such that the rear end (not shown) of the solar panel 412 is supported on a lower side of the hardtop 362. Thus, the cabin 360 and the hardtop 362 are configured as a non-pivotable rear frame 404 of the solar panel assembly 400. The forward frame 402 includes two vertical frame members 428 that extend upwardly from the port side 358 and the starboard side 360 of the hull 352 of the marine vessel 350 proximate the bow 354. Flexible connectors 429 (e.g., cables, wires, ropes, etc.) extend from the upper ends of the vertical frame members 428 and are connected to the front edge 414 of the solar panel 412 proximate the port and starboard edges 418, 420 of the solar panel 412. A retractor device (not shown) for example, the retractor drum 150 of FIGS. 1-7, may support the rear edge of the solar panel 412 on the rear frame 404. The retractor device can be configured to retract the flexible solar panel 412 and to allow the solar panel 412 to be pulled forward to be deployed. When in the retracted position, substantially all of the electricity generating surface 413 of the solar panel 412 is positioned under the hardtop 362 such that it is protected from environmental conditions. The solar panel 412 may be electrically connected to the marine vessel 350 via at least one electrical conductor that extends through and/or along a portion of the forward frame 402 or the rear frame 404.

For example, as illustrated in FIG. 8, the solar panel 412 is electrically connected to the marine vessel 350 via electrical conductors 430 that extend to a traditional accessory socket 440 (e.g., as used for anchor lights) positioned on the cabin 360. The accessory socket 440 is electrically coupled to the batteries 166 in a similar manner as the embodiments discussed above, for example running through the columns supporting the windshield of the cabin 360. In this manner, the solar panel 412 is easily electrically mated to the marine vessel 50 when deployed, and easily removed for stowing. This configuration also advantageously allows the conductors 430 and the mating with the accessory socket 440 to be covered by the front edge of the hardtop and thus sheltered from the elements.

In another example, also illustrated in FIG. 8, one of the flexible connectors 429 that extends from the front edge 414 of the solar panel 412 is or includes a conductor electrically coupled to the solar cells of the solar panel 412. This flexible connector 429 either extends through, or plugs into a like socket at the top of, the corresponding one of the vertical frame members 428. In the case of a configuration in which the flexible connector 429 runs through the vertical frame member 428 (see e.g., the conductor 164 of FIG. 2), the flexible connector 429 is electrically mated to the marine vessel 50 by plugging the flexible connector 429 into the accessory socket 440, which is supported by the hull near where the vertical frame member 428 is supported. The flexible connector 429 may also or alternatively run adjacent to at least a portion of the vertical frame member 428, for example being clipped, hook-and-loop fasteners, or otherwise secured thereto.

In an example in which the flexible connector 429 plugs into the top of the vertical frame member 428, a separate conductor then runs through the vertical frame member 428 (see e.g., the conductor 164 of FIG. 2) and is electrically coupled to a mating connector at the bottom of the vertical frame member 428, which is shown in FIG. 8 mated with the accessory socket 440 in the hull where the vertical frame member 428 is supported. In this manner, the vertical frame member 428 functions similarly to a conventional anchor light in that the electrical mating and the positional fixation is provided together simply by inserting the vertical frame member 428 downwardly into the accessory socket 440.

It should be recognized that other mechanisms for electrically coupling the solar panel 412 to the marine vessel 50 are contemplated. This includes different types of connectors for electrical mating conductors, physically anchoring vertical frame members, and/or at different locations on the marine vessel. The present disclosure also contemplates configurations in which the frame and the solar panel are coupled together, such a fiberglass sun shade for a kayak or other type of marine vessel. The conductors may extend through the fiberglass poles, and/or run adjacently as described above. In this example, one of the poles may be considered to be selectively fixed relative to the marine vessel by virtue of being coupled to the marine vessel first, and another of the poles is moveably coupled to the marine vessel to be moveable relative to the first frame into a stowed position and a deployed position based on whether or not the other pole has also been fixed to the marine vessel. For example, two rear fiberglass poles may be fixed to the marine vessel, whereby the solar panel assembly becomes deployed when one or two additional fiberglass poles are also fixed to the marine vessel, thereby positioning the solar panel in a functional manner.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A solar panel assembly for a marine vessel, the solar panel assembly comprising:

a first frame configured to be selectively fixed relative to the marine vessel;

a second frame configured to be moveably coupled to the marine vessel to be moveable relative to the first frame into a stowed position and a deployed position;

a solar panel having a surface supported by a flexible sheet that extends between a first end and a second end, the first end being coupled to the first frame and the second end being coupled to the second frame, wherein positioning the second frame in the stowed position causes most of the surface of the solar panel to be obscured and inoperable to generate electricity, and wherein positioning the second frame in the deployed position causes most of the surface of the solar panel to be exposed and operable to generate the electricity, wherein the first frame and the second frame each have upright poles that extend upwardly away from the marine vessel when the second frame is in the deployed position; and a drum upon which the flexible sheet rolls up when the second frame is in the stowed position, wherein the drum is supported vertically above the marine vessel by at least a portion of the upright poles when the second frame is in the deployed position.

2. The solar panel assembly according to claim 1, wherein the solar panel is configured to provide shade for the marine vessel when the second frame is in the deployed position.

3. The solar panel assembly according to claim 1, wherein the drum is rotatably coupled to the first frame, and wherein the drum is wound so as to automatically roll up the flexible sheet when the second frame is moved towards the stowed position.

4. The solar panel assembly according to claim 1, wherein the drum is configured such that the flexible sheet is unrolled by moving the second frame towards the deployed position.

5. The solar panel assembly according to claim 1, wherein the second frame is moveably pivotally.

6. The solar panel assembly according to claim 5, wherein the second frame is pivotally coupled to the first frame.

7. The solar panel assembly according to claim 1, wherein the solar panel is electrically coupled to the marine vessel via conductors that extend through the first frame and/or the second frame.

8. The solar panel assembly according to claim 1, wherein the marine vessel is configured to be situated in a body of water, and wherein the first frame and the second frame are configured such that when the first frame is in the deployed position the surface of the solar panel is substantially parallel to a surface of the body of water.

9. The solar panel assembly according to claim 1, wherein the marine vessel has a helm positioned therein, and wherein the first frame and the second frame are configured such that when the first frame is in the stowed position the solar panel is positioned entirely aft of the helm and when the first frame is in the deployed position the second end of the solar panel extends forward of the helm to thereby provide shade for the helm.

10. The solar panel assembly according to claim 1, wherein the solar panel has a width that is unchanged by moving the second frame, wherein at least one of the first frame and the second frame comprises opposing side poles laterally separated by a span with an upper cross-member extending therebetween, and wherein the solar panel is coupled to the at least one of the first frame and the second frame below the upper cross-member such that the width of the solar panel is approximately equal to the span between the side poles.

11. The solar panel assembly according to claim 1, wherein the surface of the solar panel is substantially planar when the second frame is in the deployed position and substantially non-planar when the second frame is in the stowed position.

12. A solar panel assembly configured for selectively provided shade for a marine vessel, the solar panel assembly comprising:

a first frame configured to be selectively fixed relative to the marine vessel; and a second frame configured to be moveably coupled to the marine vessel to be moveable relative to the first frame into a stowed position and a deployed position, wherein the first frame and the second frame each have upright poles that extend upwardly away from the marine vessel when the second frame is in the deployed position;

a flexible solar panel having a surface that extends between a first end and a second end and is configured to generate electricity; and a drum rotatably coupled to the first frame, wherein the drum is supported vertically above the marine vessel by upright poles of the first frame, wherein the first end of the flexible solar panel is coupled to the drum, and wherein the second end of the flexible solar panel is coupled to the first frame such that the flexible solar panel unrolls from the drum when moving the second frame towards the deployed position and rolls onto the drum when moving the second frame towards the stowed position, whereby unrolling the flexible solar panel provides shade for the marine vessel.

13. The solar panel assembly according to claim 12, wherein the drum is wound so as to automatically roll the flexible solar panel thereon when the second frame is moved towards the stowed position.

14. The solar panel assembly according to claim 12, wherein the first frame and the second frame are selectively movable relative to the marine vessel into a folded configuration in which the first frame and the second frame are folded onto the marine vessel.

15. The solar panel assembly according to claim 12, further comprising a motor operable to move the second frame relative to the marine vessel.

16. The solar panel assembly according to claim 15, wherein the motor is operable to rotate the drum.

17. The solar panel assembly according to claim 12, wherein the first frame and the second frame are configured such that the first end and the second end of the flexible solar panel are approximately a same height above the marine vessel as each other when the second frame is in the deployed position.

18. The solar panel assembly according to claim 17, wherein the first frame and the second frame are further configured such that the first end and the second end of the flexible solar panel are approximately the same height above the marine vessel as each other when the second frame is in the stowed position.

19. A solar panel assembly for a marine vessel, the solar panel assembly comprising:

a first frame configured to be selectively fixed relative to the marine vessel;

a second frame configured to be pivotally coupled to the first frame to be moveable into a stowed position and a deployed position, wherein the first frame and the second frame each have upright poles that extend upwardly away from the marine vessel when the second frame is in the deployed position, and wherein the second frame is farther from the first frame in the deployed position than in the stowed position;

a drum rotatably coupled to the first frame, wherein the drum is supported vertically above the marine vessel by the upright poles of the first frame; and a flexible solar panel having a surface that extends between a first end and a second end and is configured to generate electricity, wherein the first end of the flexible solar panel is coupled to the drum so as to rotate therewith, wherein the second end of the flexible solar panel is coupled to the first frame, and wherein the drum is rotationally biased relative to the first frame such that pivoting the second frame towards the first frame causes the flexible solar panel to be automatically rolled onto the drum and pivoting the second frame away from the first frame opposes the rotational bias and causes the flexible solar panel to automatically unroll from the drum; and a conductor that extends through the first frame and/or the second frame for electrically coupling the flexible solar panel to the marine vessel, wherein when the second frame is in the stowed position most of the surface of the solar panel is inoperable to generate electricity, and wherein when the second frame is in the deployed position most of the surface of the solar panel to be exposed and operable to generate the electricity.

* * * * *